(12) United States Patent
Munsters

(10) Patent No.: US 8,973,644 B2
(45) Date of Patent: Mar. 10, 2015

(54) ROLLABLE SCREEN ASSEMBLY

(75) Inventor: Paulus Johannes Wilhelmus Munsters, Uden (NL)

(73) Assignee: Inalfa Roof Systems Group B.V., Venray (NL)

( * ) Notice: Subject to any disclaimer, the term of this patent is extended or adjusted under 35 U.S.C. 154(b) by 314 days.

(21) Appl. No.: 13/220,031

(22) Filed: Aug. 29, 2011

(65) Prior Publication Data
US 2012/0048484 A1    Mar. 1, 2012

(30) Foreign Application Priority Data

Sep. 1, 2010   (EP) ..................................... 10174821

(51) Int. Cl.
| E06B 9/56 | (2006.01) |
| A47G 5/02 | (2006.01) |
| A47H 1/00 | (2006.01) |
| A47H 1/13 | (2006.01) |
| E06B 9/17 | (2006.01) |
| B60J 1/20 | (2006.01) |
| E06B 9/44 | (2006.01) |
| E06B 9/50 | (2006.01) |
| E06B 9/60 | (2006.01) |

(52) U.S. Cl.
CPC ................. *B60J 1/2063* (2013.01); *E06B 9/44* (2013.01); *E06B 9/50* (2013.01); *E06B 9/60* (2013.01)
USPC ........................................ 160/313; 160/323.1

(58) Field of Classification Search
USPC .............. 160/294, 315, 313, 318, 323.1, 324, 160/325, 326; 248/269, 267, 268, 270, 271, 248/272
See application file for complete search history.

(56) References Cited

U.S. PATENT DOCUMENTS

| 1,212,969 A | * | 1/1917 | Schuler et al. ................ 76/104.1 |
| 1,600,374 A | * | 9/1926 | Talbot ............................ 248/268 |
| 4,228,843 A | * | 10/1980 | Kobayashi ..................... 160/306 |

(Continued)

FOREIGN PATENT DOCUMENTS

| DE | 19531954 A1 | 4/1996 |
| EP | 1598517 | 5/2005 |
| EP | 1703071 A1 | 9/2006 |

OTHER PUBLICATIONS

Official Search Report of the European Patent Office in counterpart foreign application No. EP10174821.8 filed Sep. 1, 2010.

*Primary Examiner* — Katherine Mitchell
*Assistant Examiner* — Jeremy Ramsey
(74) *Attorney, Agent, or Firm* — Steven M. Koehler; Westman, Champlin & Koehler, P.A.

(57) ABSTRACT

A rollable screen comprises a rotatable winding tube for a screen mounted for rotation in a stationary mounting assembly and a spring for loading said winding tube in a direction for winding the screen onto the winding tube. A first end of said spring is connected to the winding tube and a second end is connected to a mounting part positioned within the winding tube and connected to the stationary mounting assembly. Said mounting part comprises projecting locking elements for cooperation with corresponding locking members of the mounting assembly and for a rotation relative thereto between a first rotational position in which the mounting part can be inserted in or removed from the mounting assembly, and a second rotational position in which the locking elements and locking members prevent any translational movement of the rollable screen relative to the stationary mounting assembly.

17 Claims, 3 Drawing Sheets

(56) References Cited

U.S. PATENT DOCUMENTS

| | | | |
|---|---|---|---|
| 5,464,052 A * | 11/1995 | Wieczorek et al. | 160/23.1 |
| 6,039,107 A | 3/2000 | Pittard | |
| 6,454,346 B1 | 9/2002 | Nabuurs | |
| 6,457,688 B1 | 10/2002 | Welfonder | |
| 7,201,417 B2 * | 4/2007 | Teo | 296/24.4 |
| 7,547,132 B2 * | 6/2009 | Davids et al. | 366/91 |
| 7,694,712 B2 | 4/2010 | Schimko et al. | |
| 2007/0039701 A1 * | 2/2007 | Wieczorek et al. | 160/370.22 |

* cited by examiner

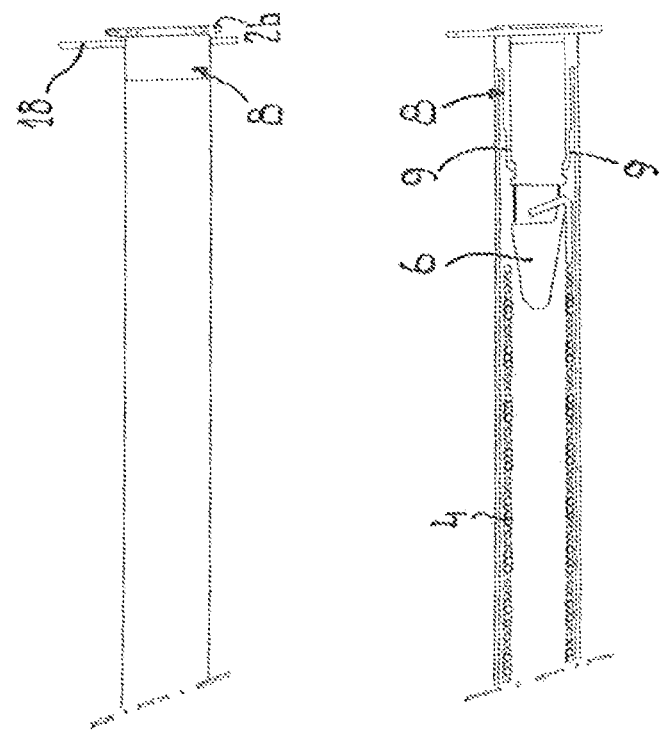
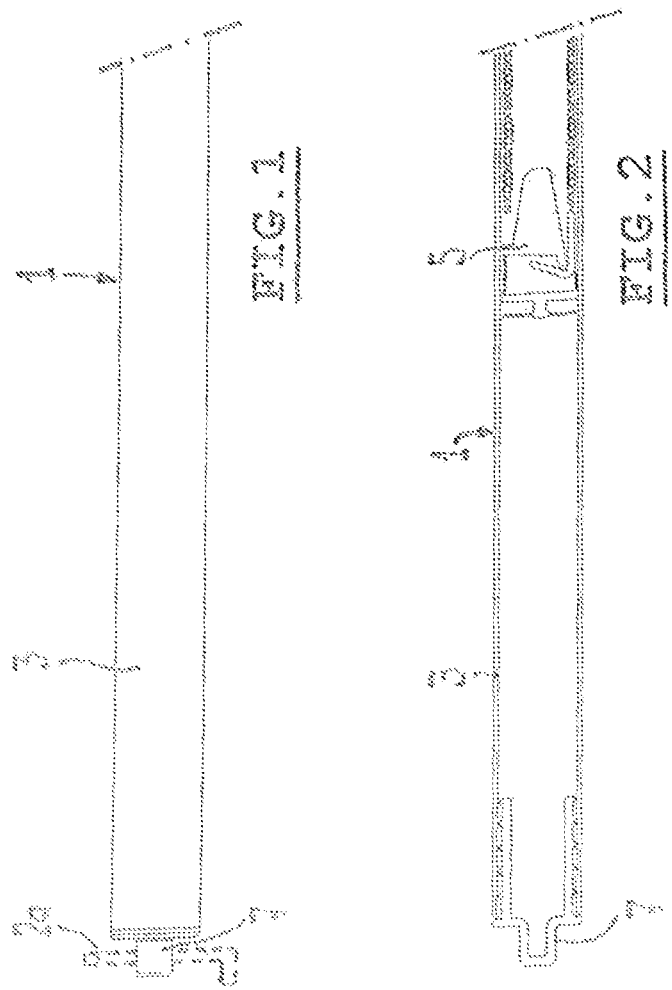

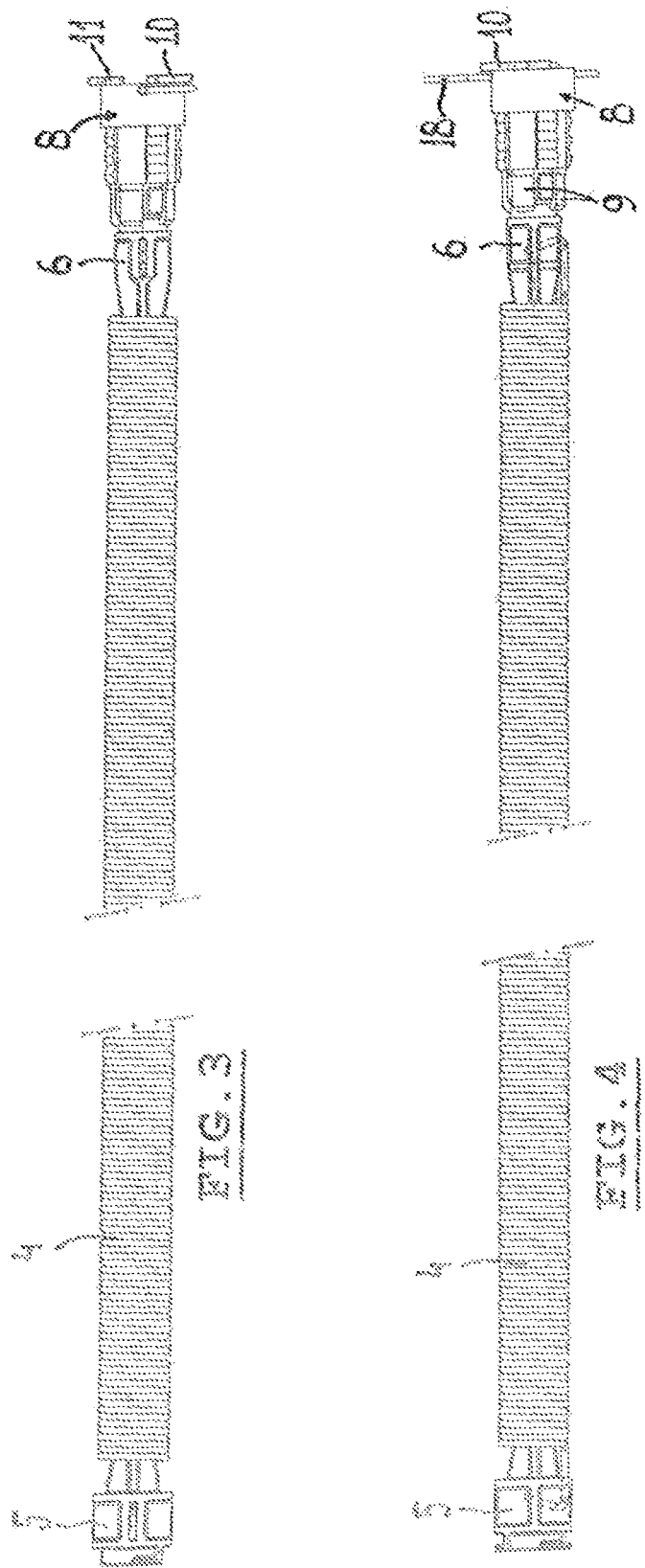

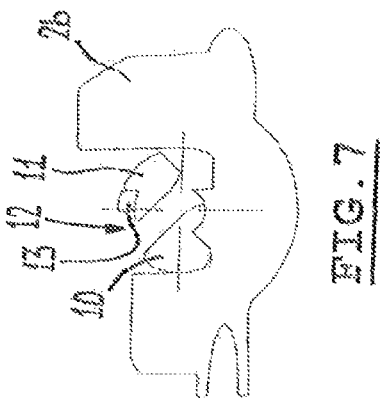
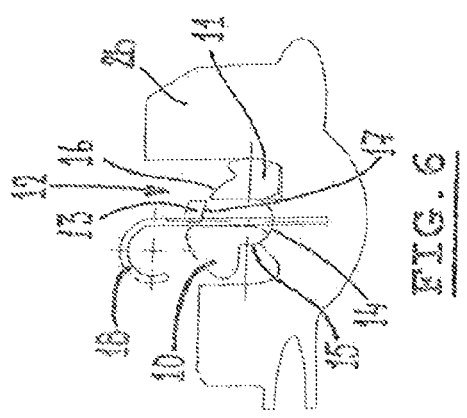
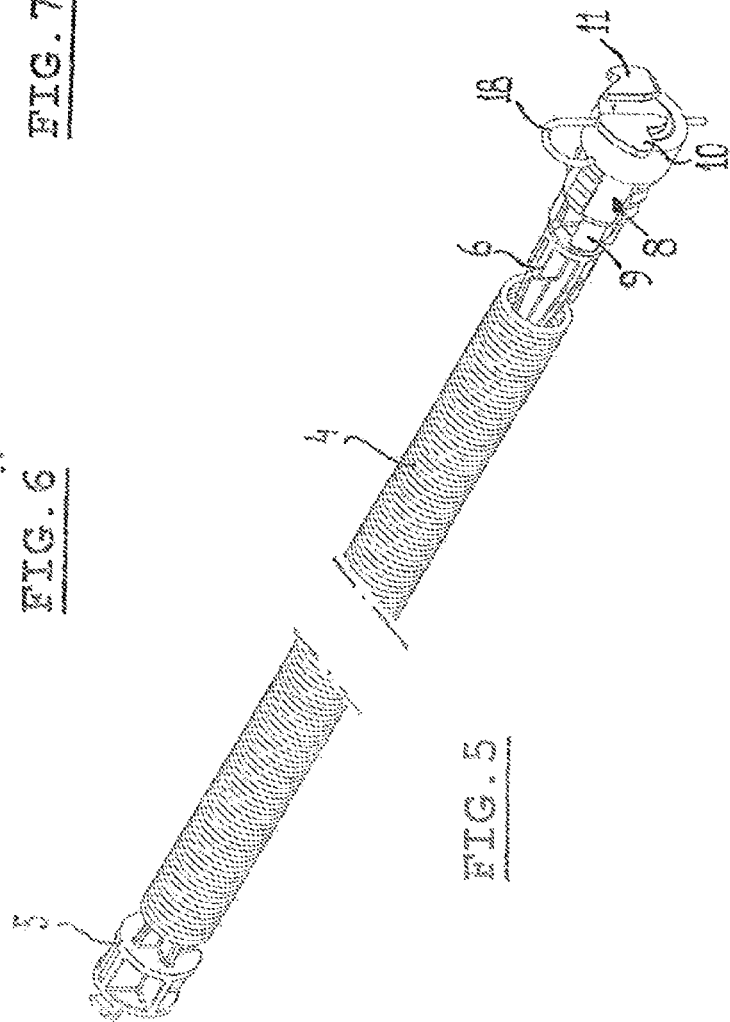
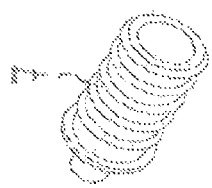

ROLLABLE SCREEN ASSEMBLY

BACKGROUND

The discussion below is merely provided for general background information and is not intended to be used as an aid in determining the scope of the claimed subject matter.

Aspects of the invention relate to a rollable screen (a so-called "rollo") assembly, comprising a rollable screen and a stationary mounting assembly therefore, wherein the rollable screen comprises a rotatable winding tube for a screen (herein includes a shade) mounted for rotation in the stationary mounting assembly and a spring for loading said winding tube in a direction for winding the screen onto the winding tube, of which spring a first end is connected to the winding tube and of which a second end is connected to a mounting part positioned within the winding tube and connected to the stationary mounting assembly.

In a known type of rollable screen assembly (for example as applied in open roof constructions for vehicles) the mounting part comprises a stationary shaft extending centrally within the winding tube over at least part of its length. For mounting or dismounting the rollable screen to or from the stationary mounting assembly, the shaft has to be attached to or detached from the stationary mounting assembly, requiring dedicated attachment devices and tools.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

A rollable screen assembly is provided in which said mounting part comprises projecting locking elements for cooperation with corresponding locking members of the mounting assembly and for a rotation relative thereto between a first rotational position in which the mounting part can be inserted in or removed from the mounting assembly, and a second rotational position in which the locking elements and locking members prevent any translational movement of the rollable screen relative to the stationary mounting assembly, and wherein said spring loads the mounting part towards the second rotational position.

As a result of this construction the spring is used for two functions. Firstly, as is common for such springs, for loading the winding tube in a direction for winding the screen thereon. And secondly for creating a locking engagement between the mounting part and stationary mounting assembly which does not need any additional means to maintain said locking state. During mounting, the mounting part (thus the locking elements thereof) initially is kept in its first rotational position and finally is released to move to the second rotational position by the spring. During normal operation the spring maintains said second rotational position and prevents that the rollable screen can become detached from the stationary mounting assembly. When, however, the rollable screen has to be removed (e.g. for servicing) the locking elements of the mounting part are rotated towards the first rotational position against the spring load of the spring.

In one embodiment of the rollable screen assembly a lock is provided for temporarily locking the mounting part with respect to the winding tube.

The lock maintains the spring in a loaded position (as will be needed for a proper operation of the rollable screen assembly, i.e. winding the screen) even when the rollable screen has not yet been mounted to the stationary mounting assembly. The lock, however, will be removed when the mounting part has been brought into engagement with the stationary mounting assembly and yet is in its first rotational position, after which the mounting part (the locking elements) rotate to the second rotational position under influence of the spring.

In one embodiment, then, of the rollable screen assembly the lock comprise a locking pin insertable through aligned apertures in the winding tube and mounting part. For example, when installing the rollable screen assembly, firstly the spring is loaded as needed by sufficiently rotating the mounting part relative to the winding tube. Then the apertures of the mounting part and winding tube are aligned and the locking pin is inserted. Next the mounting part is engaged with the stationary mounting assembly in its first rotational position and, after removing the locking pin, automatically rotates towards the second rotational position in which the mounting process is completed.

The locking pin likewise may be used again when the rollable screen is detached from the stationary mounting assembly.

In another embodiment of the rollable screen assembly, the mounting part extends through and is borne by a bearing member which is attached to the winding tube. Such a bearing member enables a good functioning of the rollable screen during normal operation, i.e. a proper rotation of the mounting part with respect to the winding tube without the need for a complicated inner shape of the winding tube. It also may make the installation of the mounting part into the winding tube easier.

As an example, the bearing member may be compressible by the winding tube for locking the mounting part in a rotatable state. In a non-compressed state of the bearing member the mounting part is inserted therein and next the assembly of bearing member and mounting part is inserted into the winding tube. The bearing member is compressed then and the mounting part is locked therein while remaining rotatable.

In yet another embodiment of the rollable screen assembly, in said first rotational position of the locking elements of the mounting part said mounting part can be inserted in or removed from the stationary member of the mounting assembly in a direction substantially perpendicularly to the longitudinal axis of the winding tube.

As a result the space needed for mounting or dismounting the rollable screen is minimized because no movements in the longitudinal direction of the winding tube are required.

In a special embodiment, the locking members of the stationary member of the mounting assembly comprise a recess for receiving the locking elements of the mounting part, with an entrance opening and an abutment member positioned in said entrance opening, wherein the locking elements comprise two spaced locking wings, which in said first rotational position may pass at opposite sides from the abutment member for entering or leaving the recess, and wherein in the second rotational position one of said wings cooperates with the abutment member for preventing the mounting part to leave the recess.

For enabling a smooth transition from one rotational position in another, it is possible that at least one of said wings and the wall of said recess define cooperating circle segment shaped guides. It is also possible that at least one of said wings and the abutment member define cooperating circle segment shaped guides.

BRIEF DESCRIPTION OF THE DRAWINGS

Hereinafter, aspects of the invention will be elucidated while referring to the drawings in which an embodiment of the rollable screen assembly is shown and in which:

FIG. 1 shows a side elevational view of a rollable screen assembly;

FIG. 2 shows a schematic longitudinal section of the rollable screen illustrated in FIG. 1;

FIG. 3 shows the inner parts of the rollable screen in a top plan view;

FIG. 4 shows the inner parts of the rollable screen in a side elevational view;

FIG. 5 shows the inner parts of the rollable screen in a perspective view;

FIG. 6 shows the cooperation between mounting part and stationary mounting assembly in a first rotational position, and FIG. 7 shows the cooperation between mounting part and stationary mounting assembly in a second rotational position.

DETAILED DESCRIPTION OF THE ILLUSTRATIVE EMBODIMENTS

Firstly referring to FIGS. 1 and 2, a rollable screen assembly comprises a rollable screen 1 and a stationary mounting assembly 2a,2b therefore. The stationary mounting assembly 2a,2b has been indicated schematically in dotted lines. The rollable screen 1 comprises a rotatable winding tube 3 for a screen (not illustrated) and mounted for rotation in the stationary mounting assembly 2a,2b. Further a spring 4 is illustrated for loading said winding tube 3 in a direction for winding the screen onto the winding tube. A first end of the spring 4 is connected to the winding tube 3 by means of an intermediate member 5 and a second end is connected to a mounting part 6 positioned within the winding tube and connected to part 2b of the stationary mounting assembly in a manner to be described later.

Reference is made too to FIG. 5 (in which the winding tube 3 is omitted), clearly showing the (torsion) spring 4, intermediate member 5 and mounting part 6. Further FIG. 5 illustrates a bearing part 7 (also indicated in FIGS. 1 and 2) which is attached to the winding tube 3 and with which the winding tube is borne in part 2a of the stationary mounting assembly.

As an alternative it is possible to combine parts 5 and 7, but for purposes of tensioning the spring 4 (as is known per se) this is not preferred.

The mounting part 6 extends through and is borne by a bearing member 8 which is attached to (in the present case inserted into) the winding tube 3 (e.g. clamped). It is possible for example that the bearing member 8 is compressible by the winding tube 3 when being inserted therein for locking the mounting part 6 in a rotatable state. As an example, the bearing member 8 may comprise flexible fingers 9 which, when compressed, engage the mounting part 6.

As shown best in FIG. 5 said mounting part 6 comprises projecting locking elements 10,11 for cooperation with corresponding locking members (to be described later) of part 2b of the mounting assembly. Said locking elements 10,11 are rotatable relative to said part 2b between a first rotational position in which the mounting part 6 can be inserted in or removed from said part 2b of the mounting assembly, and a second rotational position in which the locking elements and locking members prevent any translational movement of the rollable screen 1 relative to the stationary mounting assembly 2a,2b, and wherein said spring 4 loads the mounting part 6 towards the second rotational position.

The locking members of the stationary member 2b of the mounting assembly comprise a recess 12 (see FIGS. 6 and 7) for receiving the locking elements 10,11 of the mounting part, with an entrance opening and an abutment member 13 positioned in said entrance opening. The locking elements are shaped as two spaced locking wings 10,11, which in said first rotational position (FIG. 6) may pass at opposite sides from the abutment member 13 (in FIG. 6 in a vertical downward direction substantially perpendicularly to the longitudinal axis of the winding tube) for entering the recess 12. Upon rotation of said wings (in FIG. 6 anti clockwise) the second rotational position is reached (as illustrated in FIG. 7) in which wing 11 cooperates with the abutment member 13 for preventing the mounting part 6 to leave the recess 12 in the opposite direction.

Wing 10 and the inner wall of said recess 12 define cooperating circle segment shaped guides 14,15 for guiding the rotation between the first and second rotational positions.

Likewise wing 11 and the abutment member 13 define cooperating circle segment shaped guides 16 and 17.

A locking pin 18 which is insertable through aligned apertures (not illustrated in detail) in the winding tube 3 and mounting part 6 (and the bearing member 8, if provided) is provided for temporarily rotationally locking the mounting part 6 with respect to the winding tube 3, especially during mounting the rollable screen into the mounting assembly 2a,2b. Upon removal of said pin 18 the spring 4 will urge the mounting part 6 with its wings 10 and 11 from the position illustrated in FIG. 6 towards the position illustrated in FIG. 7 and will keep it in said position.

For again removing the rollable screen 1, the winding tube 3 is rotated by hand to a position in which the apertures in the winding tube 3 and in the mounting part 6 are aligned, after which the locking pin is reinserted. Then the assembly of winding tube 3 and mounting part 6 with its wings 10,11 is rotated back to the position illustrated in FIG. 6 such that the rollable screen can be moved upwards while moving the wings 10,11 out of the recess 12.

The invention is not limited to the embodiments described before which may be varied widely within the scope of the invention as defined by the appending claims.

The invention claimed is:

1. A rollable screen assembly, comprising a rollable screen and a stationary mounting assembly therefor, wherein the rollable screen comprises a rotatable winding tube for a screen mounted for rotation in the stationary mounting assembly and a spring configured to load said winding tube in a direction for winding the screen onto the winding tube, of which a first end of the spring is connected to the winding tube and of which a second end is connected to a mounting part positioned within the winding tube and connected to the stationary mounting assembly, wherein said mounting part comprises projecting locking elements comprising two spaced locking wings and wherein the mounting assembly comprises locking members, the locking members comprising a recess configured to receive the locking wings of the mounting part, with an entrance opening and an abutment member positioned in said entrance opening, the spaced locking wings configured to cooperate with corresponding locking members of the mounting assembly and for a rotation relative thereto between a first rotational position in which the mounting part can be inserted in or removed from the mounting assembly by passing the two spaced apart locking wings at opposite sides from the abutment member for entering or leaving the recess, and a second rotational position wherein one of said wings cooperates with the abutment member for preventing the mounting part from exiting the recess, wherein when in the second rotational position, any translational movement of the rollable screen relative to the stationary mounting assembly is prevented, and wherein said spring loads the mounting part towards the second rotational position, and wherein in said first rotational position of the locking elements of the mounting part, said mounting part is inserted in or removed from the stationary member of the mounting assembly in a direction substantially perpendicularly to a longitudinal axis of the winding tube.

2. The rollable screen assembly according to claim 1, wherein means are provided for temporarily locking the mounting part with respect to the winding tube.

3. The rollable screen assembly according to claim 1, and further comprising a locking pin insertable through aligned apertures in the winding tube and mounting part.

4. The rollable screen assembly according to claim 1, wherein the mounting part extends through and is borne by a bearing member which is attached to the winding tube.

5. The rollable screen assembly according to claim 4, wherein the bearing member is compressible by the winding tube for locking the mounting part in a rotatable state.

6. The rollable screen assembly according to claim 1, wherein at least one of said wings and a wall of said recess define cooperating circle segment shaped guides, said guides having surfaces concentric with the longitudinal axis.

7. The rollable screen assembly according to claim 1, wherein at least one of said wings and the abutment member define cooperating circle segment shaped guides, said guides having surfaces concentric with the longitudinal axis.

8. A rollable screen assembly, comprising:
a rollable tube for a screen;
a stationary mounting assembly having locking members comprising an abutment member configured to hold the rollable tube for rotation about a fixed longitudinal axis, the stationary member having a recess extending radially with respect to the longitudinal axis to an outer edge;
a mounting part configured for insertion within the rollable tube and having projecting locking elements comprising two spaced apart wings configured to be received in the recess;
a spring configured to load said winding tube in a direction for winding the screen onto the rollable tube, of which a first end of the spring is connected to the rollable tube and of which a second end is connected to the mounting part when a portion thereof is positioned within the rollable tube, wherein said spring loads the mounting part from a first rotational position in which the two spaced apart wings may pass at opposite sides of the abutment member allowing radial movement of the projecting locking elements through the recess to a second rotational position where one of the wings of the projecting locking elements cooperates with the abutment member of the locking members to inhibit removal of the projecting locking elements out of the recess in a radial direction with respect to the longitudinal axis.

9. The rollable screen assembly according to claim 8, wherein the rollable tube includes apertures in the winding tube alignable with apertures in the mounting part, and further comprising a locking pin insertable through the apertures in the winding tube and the apertures mounting part when said apertures are aligned.

10. The rollable screen assembly according to claim 8, wherein the mounting part extends through and is borne by a bearing member which is attached to the rollable tube.

11. The rollable screen assembly according to claim 10, wherein the bearing member is compressible by the rollable tube for locking the mounting part in a rotatable state.

12. The rollable screen assembly according to claim 10, wherein at least one of said wings and a wall of said recess define cooperating circle segment shaped guides, said guides having surfaces concentric with the longitudinal axis.

13. The rollable screen assembly according to claim 10, wherein at least one of said wings and the abutment member define cooperating circle segment shaped guides, said guides having surfaces concentric with the longitudinal axis.

14. A rollable screen assembly, comprising:
a rollable tube for a screen;
a stationary mounting assembly configured to hold the rollable tube for rotation about a fixed longitudinal axis, the stationary member having a recess extending radially with respect to the longitudinal axis to an outer edge and an abutment member;
a mounting part configured for insertion within the winding tube and having a first projecting locking element and a second locking element, both configured to be received in the recess;
a spring configured to load said winding tube in a direction for winding the screen onto the winding tube, of which a first end of the spring is connected to the winding tube and of which a second end is connected to the mounting part when a portion thereof is positioned within the winding tube, wherein said spring loads the mounting part from a first rotational position allowing radial movement of the first and second projecting locking elements through the recess to a second rotational position where the abutment member cooperates with the first projecting locking element to hold the rollable tube for rotation about the fixed longitudinal axis wherein the first locking element and the abutment member define cooperating arc-of-a circle shaped guides, said guides having surfaces concentric with the longitudinal axis and wherein the second locking element is configured to engage a wall of said recess and define cooperating arc-of-a circle shaped guides in the first rotational position, said guides having surfaces concentric with the longitudinal axis.

15. The rollable screen assembly according to claim 14, wherein the rollable tube includes apertures in the winding tube alignable with apertures in the mounting part, and further comprising a locking pin insertable through the apertures in the winding tube and the apertures mounting part when said apertures are aligned in the first rotational position.

16. The rollable screen assembly according to claim 14, wherein the mounting part extends through and is borne by a bearing member which is attached to the rollable tube.

17. The rollable screen assembly according to claim 16, wherein the bearing member is compressible by the rollable tube for locking the mounting part in a rotatable state.

* * * * *